A. F. KELLOGG.
CAMERA.
APPLICATION FILED FEB. 10, 1915.
1,165,181.
Patented Dec. 21, 1915.
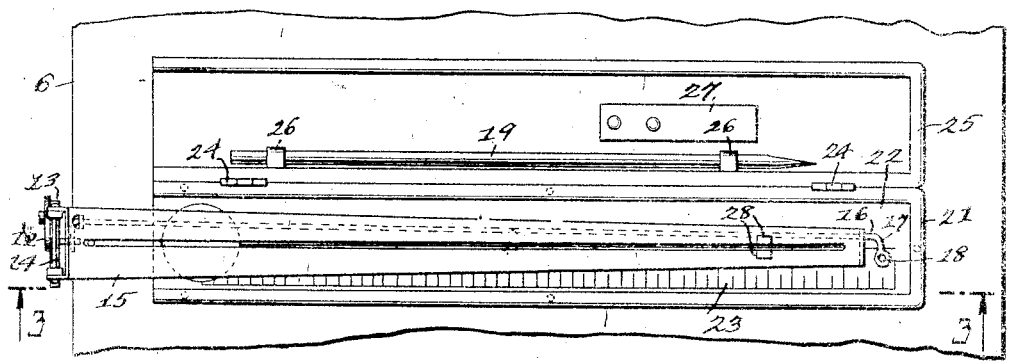
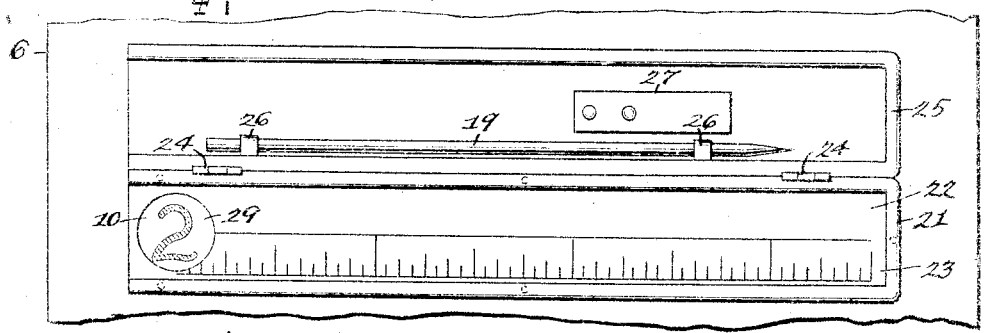
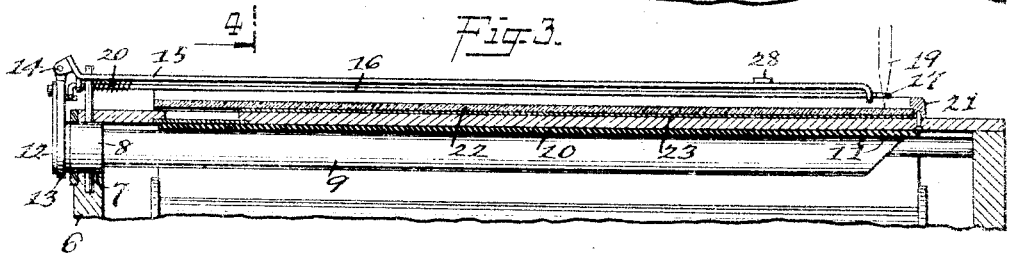
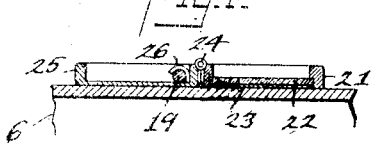
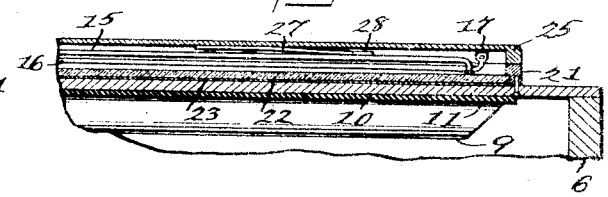
WITNESSES
George L. Blume
J. E. Larsen
INVENTOR
Alonzo F. Kellogg
BY Munn & Co.
ATTORNEYS

UNITED STATES PATENT OFFICE.

ALONZO F. KELLOGG, OF PORTAGE, WISCONSIN.

CAMERA.

1,165,181. Specification of Letters Patent. Patented Dec. 21, 1915.

Application filed February 10, 1915. Serial No. 7,272.

*To all whom it may concern:*

Be it known that I, ALONZO F. KELLOGG, a citizen of the United States, and a resident of Portage, in the county of Columbia and State of Wisconsin, have invented certain new and useful Improvements in Cameras, of which the following is a specification.

This invention relates to cameras, and is an improvement over the form shown and described in my application for Letters Patent of the United States bearing date of September 10, 1914, Serial No. 861,029, and my application for Letters Patent bearing date of Feb. 10, 1915, Serial No. 7271.

In the above referred to applications I show and describe an exposure identification device for cameras, which provides a movable arm on the camera exterior and the movement of the outer arm of which determines the identifying marks made on the sensitized element within the camera; the present invention is for the purpose of enabling a person to manipulate said arm by means of a stylus instead of a pencil and provides means for guiding the operator when no visible marks are made on the camera exterior or upon any substance on said camera. I also provide means for protecting said arm, for rendering the same immovable when not in use, and for maintaining a stylus in convenient position.

My invention is fully described in the following specification, of which the accompanying drawings form a part, in which like reference characters refer to like parts in each of the views, and in which:—

Figure 1 is a fragmentary view of a camera provided with my invention, in open position, ready for use; Fig. 2 is a similar view, with the stylus actuated arm removed; Fig. 3 is a section taken on the line 3—3 of Fig. 1; Fig. 4 is a section taken on the line 4—4 of Fig. 2; and Fig. 5 is a view similar to Fig. 3, but showing the cover in closed position.

In the drawings forming a part of this application I have shown, fragmentarily, a camera 6 provided with an aperture 7 in one end thereof. Fig. 3, which incloses a pivoted sleeve 8 carrying a tube 9 through which light is adapted to pass to act upon the sensitized element 10 through an aperture 11, the outer end of said tube being normally closed by means of a pivoted shutter 12; carried by the outer end of said tube is a support 13 for a pivot pin 14 for an arm 15 directed over the exterior surface of the camera, the swinging of the outer end of said arm correspondingly moving the free end of the tube.

The arm 15 carries a rotatable rod 16 which is angularly bent at the free end of said arm, as shown at 17, and is perforated at 18 to receive the point of a stylus 19 whereby said free arm end may be moved in the form of characters to so effect the sensitized element 10 as to reproduce the characters thereon, the angular end 17 of the rod 16 being adapted to be forced downwardly by the stylus, in the act of forming the characters, to rotate said rod against a spring 20 and to open the shutter 12 in the manner described in the application filed herewith.

Arranged on the exterior surface of the camera, beneath the normal position of the arm 15, is a frame 21 for a transparent plate 22, preferably of glass but not necessarily, and I interpose a sheet of thin material 23 between the plate 22 and the surface of the camera provided with a scale of suitable graduations thereon, and two longitudinal lines to guide the operator in maintaining the characters intended to be produced on the sensitized element in desired positions.

Hinged at 24 to the frame 21 is a cover 25 therefor, open at the end toward the pivotal support of the arm 15 as clearly shown in Figs. 1, 2, and 3; within said cover I provide spring clips 26 for the stylus 19, and I also provide therein a spring plate 27 adapted to bear upon the arm 15 to hold the same against rattling movement, and also adapted to bear against a projection 28 on said arm, Fig. 5, to prevent the withdrawal of said arm longitudinally of the cover 25 and, thus, of the tube 9 from the camera.

In the forms shown in the two applications referred to, visible writing with a pencil upon a removable strip of paper was contemplated, but it occurred to me that there was no need for visible writing as this required frequent substitution of the material written upon, and I therefore provided the present hard surface for a stylus whereon no visible marks are made, thus requiring no substitution thereof. I also decided to make this hard surface of some transparent material and arrange a graduated scale thereunder which permits the operator to definitely locate the positions of the characters on the sensitized element, and I also provide suitable guide lines for legends employing more than one character. This transparent medium also serves the purpose of rendering the peep-hole 29 of the camera and the identifying numeral of a particular exposure visible when the arm 15 is raised on its pivot 14, thus not interfering with the normal use of the camera. Further, by means of the clips 26, I prevent the loss of the stylus and insure its readiness for use, and by means of the spring plate 27 I prevent any movement of the arm 15 or connected parts.

While I have shown a present preferred detail structure, it will be obvious that I am not limited thereto, but may make changes thereover, within the scope of the following claims, without departing from the spirit of my invention, or sacrificing its advantages.

Having fully described my invention, what I claim as new, and desire to secure by Letters Patent, is:—

1. The combination with a camera having a sensitized film therein; of a movable arm pivoted upon said camera, means interior of said camera for reproducing the movements of said arm upon the surface of said film, a stylus for moving said arm, and a transparent plate serving as a bearing for said stylus secured to said camera, beneath said arm.

2. The combination with a camera having a sensitized film therein; of a movable arm pivoted upon said camera, means interior of said camera for reproducing the movements of said arm upon the surface of said film, a transparent plate secured to said camera beneath said arm, and a removable cover for said arm and plate.

3. The combination with a camera having a sensitized film therein; of a movable arm exterior of said camera, means interior of said camera for reproducing the movements of said arm upon the surface of said film, a transparent plate secured to said camera beneath said arm, a sheet provided with guide lines interposed between said plate and camera, and a cover for said arm, plate, and sheet.

4. The combination with a camera having a sensitized film therein; of a movable arm exterior of said camera, means interior of said camera for reproducing the movements of said arm upon the surface of said film, a plate provided with a hard upper surface arranged beneath said arm, a stylus for moving said arm and adapted to bear on said plate, a cover for said arm and plate, and means in said cover for holding said stylus when not in use.

5. The combination with a camera having a sensitized film therein; of a movable arm exterior of said camera, means interior of said camera for reproducing the movements of said arm upon the surface of said film, a cover for said arm hinged to said camera, and means in said cover for holding said arm against movement when said cover is closed.

In testimony whereof I have signed my name to this specification in the presence of two subscribing witnesses.

ALONZO F. KELLOGG.

Witnesses:
C. H. HALL,
A. C. KELLOGG.